United States Patent [19]
Swisher

[11] 3,647,476
[45] Mar. 7, 1972

[54] LIMONIN FREE NAVAL ORANGE JUICE AND DRINK OF MILK EMBODYING SUCH ORANGE JUICE
[72] Inventor: Horton E. Swisher, Upland, Calif.
[73] Assignee: Sunkist Growers, Inc., Los Angeles, Calif.
[22] Filed: Nov. 24, 1969
[21] Appl. No.: 879,432

[52] U.S. Cl. ................................ 99/105, 260/343.2
[51] Int. Cl. ........................................... A23l 1/02
[58] Field of Search ............... 99/100, 105, 2, 106, 103; 260/412.8, 675.5, 343.2 R

[56] References Cited
UNITED STATES PATENTS
2,816,033  12/1957  Pritchett ........................... 99/105
2,631,145  3/1953   Othmer et al. ................ 260/675.5
2,818,342  12/1957  Ransom ............................ 99/105

Primary Examiner—Norman Yudkoff
Assistant Examiner—Hiram H. Bernstein
Attorney—Paul A. Weilein

[57] ABSTRACT

This invention involves debittered navel orange juice and a method of debittering such juice, as well as a juice and cow's milk drink in which such debittered juice is employed, a preferably high-ester level pectin being employed in the drink to avoid large curd formation from the milk by the acid of the juice. Recovery of the bitter principle extracted from the juice is also an element.

14 Claims, 1 Drawing Figure

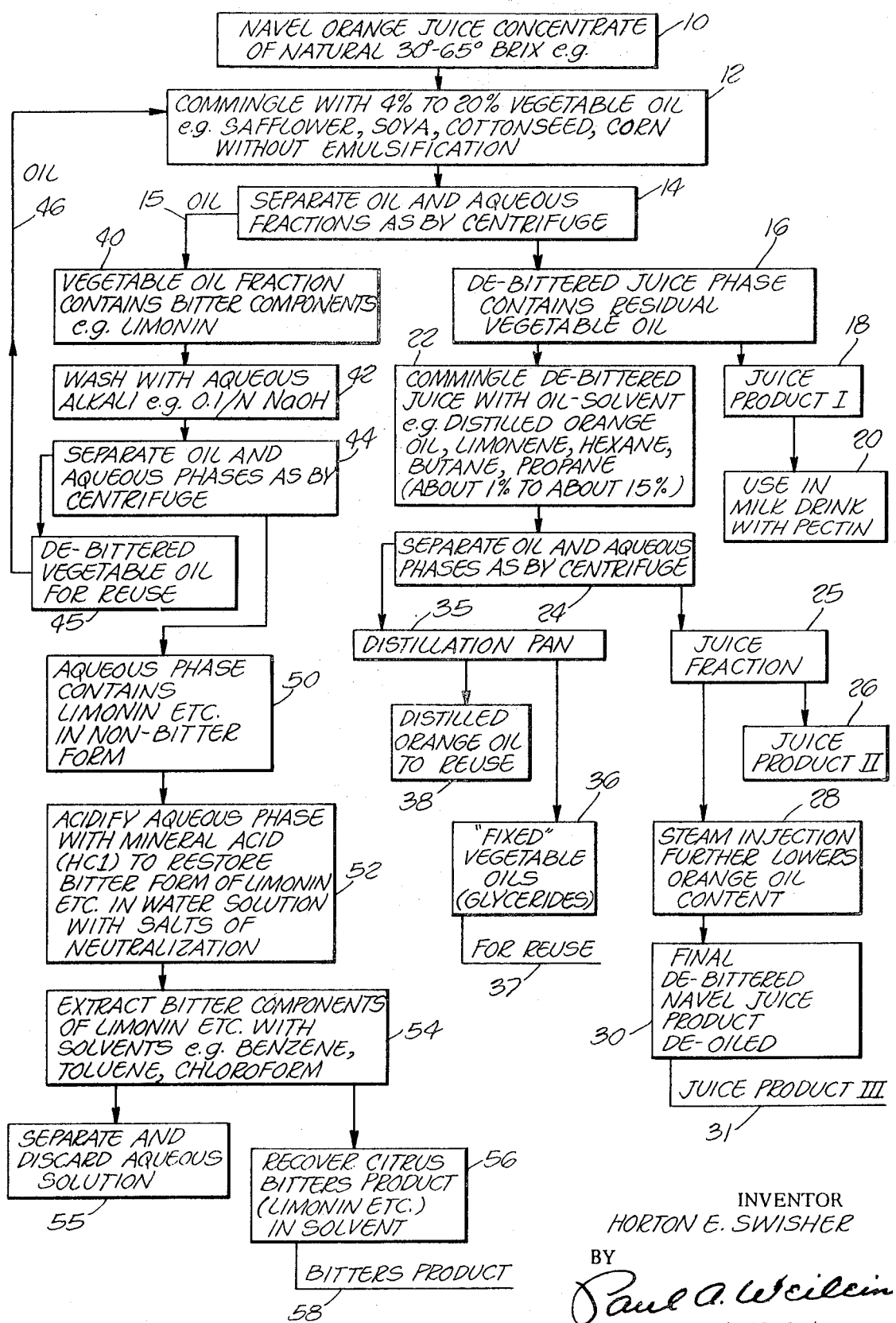

LIMONIN FREE NAVAL ORANGE JUICE AND DRINK OF MILK EMBODYING SUCH ORANGE JUICE

BACKGROUND OF THE INVENTION

1. Field of Invention

This invention relates to liquid foods, and more especially to citrus fruit juices. It relates also to combinations of such juices with other liquid foods, more especially animal milk such as cow's milk.

2. Prior Art

The Swisher Pat. No. 2,834,687 of 1958, discloses the control of bitterness in navel orange juices by adjusting the pH value between 4 to 7 before bitterness has developed and reducing moisture content to not more than about 4 percent, as distinguished from the present method of selective absorption of the bitter constituents from the juice with a vegetable oil such as cottonseed oil or the like. The Pritchett, U.S. Pat. No. 2,816,033 of 1957, discloses the removal of the bitter constituents from the juice of isopropanol, acetone, methyl-ethyl ketone and similar light chemical solvents, in the hydrocarbon classification, in conjunction with a minor proportion of solid mineral absorbent such as fullers' earth, bentonite or activated char.

The Dutch Pat. No. 171,194 of Nov. 16, 1953, discloses the use of orange and other juices containing pectin in making a fruit-juice-milk drink without reference to debittered navel orange juice.

The Ransom U.S. Pat. No. 2,818,342 discloses an orange-milk drink without reference to debittered navel orange juice.

SUMMARY OF THE INVENTION

The invention involves the method and the product from removing bittering constituents from navel orange juice by commingling such juice with a normally liquid edible vegetable oil absorbing the bitter constituents. The invention includes also recovering bitter constituents from the oil. Further included is a highly nutritious drink of the debittered juice and cow's milk.

DETAILED DESCRIPTION OF THE INVENTION

The accompanying drawing is a flow sheet outlining the principal steps and features of the invention and details in their consecutive relationships. The features are indicated in boxes conventional for flow sheets, and such boxes are numbered to facilitate reference.

As well known in the industry, navel orange juice commonly is bitter, at least after standing several hours or after commercially processing by pasteurization. The bitter constituents are usually considered to be the triterpenoid derivatives, limonin and isolimonin. Apparently the navel orange juice derives these bitter compounds from the albedo, center bundles, cell sacs, and the veins of the section coverings, since the bitter constituents are not found in the juice itself before it has been extracted from the rind and pulp. Such bitterness is not found in Valencia oranges except in the seeds. Limonin is so bitter that a solution of one part in 100,000 parts of water yields a distinctly bitter taste. Nonbitter salts, however, are formed with the alkali and alkaline earth metals, but these revert to the bitter form in acid solution such as at the pH of orange juice.

I have discovered that these bitter constituents are selectively dissolved or absorbed by the vegetable oils when such oils and the bitter navel orange juice are intimately commingled. The normally liquid edible vegetable oils are particularly suitable. The bitter constituents thus pass from the aqueous navel orange juice into the oil phase and leave the juice in debittered form to provide a palatable navel orange juice, which is itself an attractive orange drink or may be combined with cow's milk to produce an orange-juice-milk drink as detailed hereinafter. Among all solvents that might have potential for debittering navel orange juice, vegetable oils are unique in that they are accepted food products, and they do not alter the composition of orange juice by removing Vitamin C, citric acid or soluble solids (sugars).

Referring particularly to the flow sheet, it is desirable in practice to treat navel orange juice concentrates as indicated at box 10 in strengths of about 30° to 65° Brix, but natural strength juices, also known as single strength juices, may be treated in the same manner. The bitter juice is commingled with a chosen vegetable oil in the proportion of about 4 percent to about 20 percent of oil based on the juice as indicated at 12. Normally liquid edible oils are commonly used, such as the highly unsaturated oils like safflower oil, but more saturated oils like corn oil, soya oil and cottonseed oil are also usable. Other usable oils and fats include coconut oil, peanut and rice oils, hydrogenated fats and oils, acetylated monoglycerides, and bland citrus seed oil. Commingling should be effected without aeration of emulsification, as by careful mechanical mixing or by boiling under vacuum in a temperature range of 10° to 80° C. Such commingling is maintained for a time long enough to absorb substantially all bitter constituents, for example, for a time of 10 minutes to 45 minutes. An important discovery is that, to be effective in debittering, the fatty oil must commingle with the bitter juice but not form a highly aerated middle phase stabilized by juice pulp which cannot be broken. This is best accomplished by using deaerated juice of low-pulp content with careful commingling. Another unexpected discovery is that navel orange juice concentrates, debittered as described, have a lowered viscosity and a lesser tendency to form gels than their untreated counterparts.

After adequate extraction has resulted, the oil and aqueous phases are separated from each other as by centrifuging or stratification by settling and decantation as at 14. The oil fraction is removed as indicated by line 15 for recovery of the oil and its contained bitters, and the debittered orange juice is removed to a vessel 16. From the vessel 16, the debittered orange juice (which always contains a small residue of oil) may be recovered as a juice Product I at 18. This Product I may in turn be employed in making a milk-orange juice drink with pectin, as indicated at 20 and described more fully hereinafter.

On the other hand, some or all of the debittered orange juice in the vessel 16 may be taken off for separation of the residual oil as indicated in the box 22. This is accomplished by means of a water-insoluble selective solvent for the vegetable oil such as orange oil or distilled orange oil or the terpene limonene, or a light hydrocarbon solvent such as hexane, butane or propane. If volatile solvents such as butane or propane are used, a pressure vessel is required. The percentages of such selective solvent employed may vary from about 1 percent to about 15 percent, or conceivably, under some circumstances, as high as 18 percent or even 20 percent, based on the debittered juice being treated.

As represented in box 24, the aqueous juice phase is separated from the oil phase as by centrifuging or decanting, the juice fraction being collected at 25 for removal as a juice Product II segregated at 26. Or the juice fraction in 25 may be passed to a steam injection (under reduced pressure) or equivalent treatment 28 for further lowering of the orange oil content to yield a final debittered deoiled navel juice product at 30 to be recovered at 31 as Juice Product III. The residual oil phase separated at 24 is passed to a distillation pan at 35 for separation of the heavier "fixed" vegetable oils of glycerides to the collector 36 whence they are removed at 37 for reuse. The lighter solvents, such as orange oil, being distillable, are collected at 38 for reuse.

With respect to the main body of the debittering vegetable oil collected from the centrifuge 14 as indicated by line 15, this is recovered together with its absorbed bitter components such as limonin, in a vessel 40 or the like, whence it is transferred to an aqueous alkali wash 42 for conversion of the bitter constituents in the oil, as by a tenth-normal sodium hydroxide solution, to open-ring water-soluble nonbitter form. Upon adequate agitation of the oil and aqueous alkali solution, the converted bitter constituents are transferred from the oil phase to the alkali phase, and the two phases are separated as by centrifuging at 44. The separated debittered vegetable oil is passed to a collector 45 from which it will be removed as by a return line 46 for reuse in the initial treating vessel 12.

The aqueous extract phase taken from the centrifuge 44, and now containing the initially bitter constituents in non-bitter form in alkaline water solution, is collected at 50 for dissipation. Such disposition might be to discard, but preferably the solution is subjected to acidification in apparatus 52 to restore the bitter form of the limonin and other bitter elements in the water solution along with the salts of neutralization. Such reconversion may be effected as indicated at 52 with any appropriate mineral or organic acid such as hydrochloric acid, sulphuric acid or citric acid to yield a pH of about 2 in the solution. This acid solution is next commingled with an appropriate solvent or solvents for the reconverted bitter principal limonin and other bitter constituents, which solvents are water-immiscible selective organic solvents for the bitter elements, such as benzene, toluene, chloroform, methyl ethyl ketone and the like, as at 54. The aqueous fraction is then separated as at 55. The nonaqueous solvent fraction containing the citrus bitters is recovered as at 56 to yield a citrus bitters product as at 58 from which the solvent may have been separated by distillation or as desired. Such bitters product 58 is usable as a flavoring material or as a triterpenoid starting material for pharmaceutical manufacture.

The debittered navel orange juice Product I, the debittered navel orange juice Product II, and the debittered juice Product III above described are all useful both as attractive orange juices for human consumption as such, and they are also useful for combination with animal milk (e.g., cow's milk) to make attractive milk-orange-juice drinks which do not contain the objectionable bitterness of typical navel orange juice.

Respecting the operating procedures, it has been indicated above and at 10 in the flow sheet that the juices to be treated my be concentrated as in a range of 30° Brix to 65° Brix or they may be natural strength also known as single strength. However,, it should be noted that the greater the difference in specific gravity (Sp. Gr.) between the vegetable oil used and the juice being treated, the more readily the two phases are separated whether by centrifuging or by settling and decantation. Since most vegetable oils and fats have a Sp. Gr. of about 0.92 and single strength orange juice of 12° Brix about 1.05 the difference (0.13 units) is not great enough to make for an easy separation. When the juice is concentrated to 30° Brix with Sp. Gr. of 1.13, the difference (0.21 units) is almost doubled. For a concentrate of 65° Brix with Sp. Gr. of 1.32, the difference of 0.40 units greatly aids a clean separation. For best separation, the pulp content of the juice should be low. Orange juice having a very high-pulp content tends to form a three-phase system during debittering. The middle phase, made up of pulp, juice and oil must be discarded or processed separately, either of which involves economic loss. Fine screened or centrifuged juice is preferred. Debittered navel orange juice of low pulp that results in a clean phase separation of juice and oil can be reconstituted for use as a single strength juice product. It is very important that at no time during the processing does the juice become aerated. Violent agitation in the presence of such a gas as air produces a stable emulsion which is most difficult or impossible to break. The preferred debittering treatments is to apply a vacuum to the juice and oil to deaerate, and mix with a swirling action or bring to a low rolling boil, preferably under vacuum. Although debittering has been accomplished at low temperatures (12° C.), it is preferred to have the juice at least warm if not hot, such as 20° to 90° C. The upper temperature limit is that at which a stable juice-oil-air emulsion is formed or an off-flavor is developed in the juice. Orange juice concentrates are quite viscous when cold and therefore mix poorly with the vegetable oil. At the time of centrifuging, the juice should always be warm to minimize the viscosity effect, such as 40°to 90° C.

EXAMPLES OF JUICE DEBITTERING PROCEDURES

The following examples furnish detailed descriptions of several operating procedures made in accordance with the flow sheet.

EXAMPLE 1

500 grams of very bitter 65° Brix concentrated navel orange juice was placed in a 2,000 ml. round bottom flask, With a gentle swirling action, 75 ml. soybean oil was added. After attaching the flask to a Rotovac and immersing in a 30° C. water bath, the flask and contents were allowed to rotate for three-fourths hour under 28 inch vacuum. To effectively remove the soybean oil from the concentrate, the mixture was diluted back to 30° Brix, temperature adjusted to 40° C, and centrifuged. The resulting navel orange juice was of pleasing flavor and the separated soybean oil very bitter.

EXAMPLE 2

To 7,039 grams of 65.4° Brix bitter navel orange juice concentrate in a round bottom flask, 563 grams (8 percent) cottonseed oil was added. While under 27 inch vacuum, the mixture was heated to 64° C. and carefully mixed by swirling the contents of the flask. After 30 minutes treatment, the warm juice-oil mixture was passed through a Westphalia centrifuge twice at 12,000 r.p.m. to effect separation of cottonseed oil and juice. When reconstituted and tasted, the navel juice was of acceptable flavor and the separated cottonseed oil was very bitter.

EXAMPLE 3

To further remove the small residual cottonseed oil remaining in the concentrated orange juice, 5,648 grams of debittered navel orange concentrate prepared as in Example 2 above was treated at 64° C. by swirling in a round bottom flask with 282 grams (5 percent) refreshed orange oil. After 10 minutes of agitation the mixture of warm juice concentrate and orange oil at 61° C. was passed through a Westphalia centrifuge to effect separation of juice and oil. The orange oil level was reduced from 5 percent to 0.4 percent after centrifuging. Additional centrifuging reduced the orange oil level even lower. Navel orange juice prepared in this manner may be used for preparing beverage bases for use in bottled and canned products.

EXAMPLE 4

The orange oil level of debittered navel orange juice, as indicated in Example 3, was further lowered by the controlled injection of steam into the concentrate. 4,033 grams of debittered orange juice concentrate of 65.9° Brix containing several percent of orange oil was placed in a round bottom flask. Trapped dry steam was injected into the flask while the juice was held under 25½inch vacuum. After the system was balanced the juice temperature was maintained in the range 55° to 58° C. during a 15 minute juice treatment period. The finished orange juice product was 60° Brix and the orange oil level reduced to below 0.2 percent.

EXAMPLE 5

Bitter low-pulp navel orange juice of 12.1° Brix was treated with 10 percent corn oil to debitter as indicated in Example 1. After separating the juice and corn oil by centrifuging, the corn oil was found to be very bitter. Distilled orange oil (limonene) at a 10 percent level was mixed with the juice to scavenge the residual corn oil. After centrifuging off the distilled orange oil under a vacuum of 28 inch, the juice was concentrated to 43° Brix to effect steam distillation of the remaining distilled orange oil. When reconstituted back to 12.1° Brix and tasted, the orange juice was debittered.

EXAMPLE 6

Using 1,000 g. of extremely bitter pulp-free 30° Brix concentrate prepared from washed navel finisher pulp, 80 grams (8 percent) cottonseed oil was agitated at 20° C. under 25 inch vacuum for 15 minutes followed by centrifuging. After processing, the navel finisher pulp was formed to be satisfactorily debittered and the cottonseed oil was very bitter.

EXAMPLE 7

A batch of carefully cleaned small glass beads were coated with hydrogenated fat (Crisco). These coated beads along with 30° Brix bitter navel orange juice were placed in a glass tube of a 2 inch diameter and 20 inch length. After tilting back and forth for 15 minutes at room temperature, the beads were separated from the juice by passing through a fine screen. After removing the hydrogenated fat from the beads by melting, the fat was found to be bitter and the orange juice detectably reduced in bitterness level when judged by paired tasting.

Referring to the previously mentioned use of the debittered navel orange juice with milk to produce an attractive and flavorful nonbitter drink, it is often desired to use three parts of single strength debittered juice to one part of milk. Where the debittered juice is concentrated, it will usually be reconstituted by addition of water to yield single strength juice. The proportion of juice to milk in the drink combination may be whatever is desired, such as one part juice to one part milk or two parts juice to one part milk. The larger proportions of juice to milk are entirely acceptable because with the debittered juice the drink is not bitter. The milk employed may be whole milk or skim milk ("low fat"). Especially where skim milk is used, it is not necessary to eliminate all the oil because the residual oil acts as a replacement for butter fat from the flavor and calorie standpoint. A normal range of residual oil in the product from Example 1 is around 0.5 to 1.5 percent. To control the formation of undesirable large curds, a quantity of pectin is desirably added, such as about 0.2 to about 0.5 percent depending somewhat upon the pH of the juice, the higher acidity requiring the more pectin. The pectin should be a high-methoxyl rapid set grade, as understood in the pectin art, to obtain adequate control. Various flavor additives in minor proportions may be added if desired. For example 50 to 60 grams of sugar per liter of juice-milk blend may be used, or a trace of saccharin. Further, one-tenth of a gram of vanillin might be used as desired.

As an example of a product, the following is given:

| | |
|---|---|
| Natural strength debittered navel orange juice | 1500 ml. |
| Whole milk | 500 ml. |
| Sugar | 125 grams |
| Pectin, rapid set | 3 grams |

Another example is:

| | |
|---|---|
| Natural strength debittered navel orange juice | 1000 ml. |
| Skim milk | 1000 ml. |
| Rapid set pectin | 5 grams |
| Sugar | 132 grams |
| Vanillin | 0.25 grams |
| Corn oil | 32 grams |

Using such a drink formula as the second one above, it is possible to adjust the ratio of saturated oils to polyunsaturated oil or fats as may be desired. Thus, using corn oil of safflower oil for polyunsaturated oils, or cottonseed or soya oil for more saturated oils, pleasant and nutritionally well-balanced feed products can be prepared for normal people as well as for those having to restrict their intake of saturated fats because of high-serum cholesterol levels. The combination of debittered navel orange juice and milk (there being often an over supply of navel orange juice and milk on the market) produces a very good product nutritionally for use by both children and adults. For babies who cannot tolerate the high acidity of straight orange juice, the reduced acidity and very fine curd of the stabilized juice-milk product is usually acceptable. Areas of great potential include school food service, ill and infirm persons and for weight control. Orange juice supplies the vitamin C which is lacking in pasteurized milk and milk supplies the protein, riboflavin and calcium which are poorly supplied by orange juice. If desired, egg can be included to add significant amounts of iron as a health measure for young children and pregnant women. For those who wish to add weight, egg is also an advantage, along with added vegetable oils, to increase calories.

A dietetic product can be made from skim milk (or powdered skim milk) without added oil. By using whole milk, with or without added oils, an equally tasty food can be prepared having high-calorie value for those wishing to gain weight. Thus, a considerable range of nonbitter navel orange juice and milk drinks may be readily provided for the orange industry and the navel orange over supply disposed of.

A typical 50:50 orange juice-milk breakfast beverage or snack drink is the following:

| | |
|---|---|
| Debittered orange juice concentrate 42½ Brix | 148.4 g. |
| Non-fat cow's milk | 500 ml. |
| Pectin (rapid set) | 2.5 g. |
| Water | 375 ml. |
| Sugar (or in 50–75 g. range) | 60 g. |
| Vanillin U.S.P. | 0.125 g. |
| Citric acid anhydrous (to yield pH 4.00) about | 2 g. |

The pectin is hydrated with a portion of the water, or preferably is dusted with the other solids with stirring into most of the water (some held for later pH adjustment), or the pectin is hydrated in the juice or milk prior to their combination. Allow 15–30 minutes for hydration.

A further desirable use to which the present debittered navel orange juice may be put is for the preparation of orange juice drinks as "orangeades." Where the debittered product is a concentrate such as a 65° Brix juice, the latter is reconstituted with water and with such further flavorings as may be desired, including sugar, citric acid and orange oil. Thus, a 30 percent orange juice beverage uses a "base formula" of

| | |
|---|---|
| Debittered navel orange juice, 65° Brix | 88 gal. |
| Water | 9 gal. |
| C.P. orange oil | 2.5 lb. |
| Citric acid, anhydrous | 37 lb. |

The final beverage is then made with

| | |
|---|---|
| above base formula | 1 gal. |
| Sugar | 16 lb. |
| Water | 18 gal. |
| Yielding about | 20 gal. |

More water, along with more sugar and citric acid if desired, will yield a 15 percent orangeade.

I claim:

1. A method for debittering navel orange juice consisting essentially of intimately commingling the juice with a vegetable oil effecting absorption of the bitter constituents in the oil, and separating the resulting oil from the juice to yield a debittered navel orange juice.

2. A method as in claim 1 wherein the vegetable oil is an edible normally liquid oil.

3. A method as in claim 1 and the additional procedure of separating the citrus bitters from the oil as a bitter product.

4. A method as in claim 1 wherein the oil containing the citrus bitters is washed with an aqueous alkaline solution converting the bitter constituents to water-soluble form, and such bitter constituents are separated from the oil.

5. A method as in claim 4 wherein such separated water-soluble bitter constituents are separated from the water by water-immiscible selective solvent for the bitters.

6. A method as in claim 1 wherein the separated vegetable oil is recycled to the bitter-juice treating stage.

7. A method as in claim 1 wherein the debittered juice is treated with a vegetable oil solvent removing residual oil from the juice.

8. A method as in claim 7 wherein the debittered orange juice is subjected to controlled steam treatment removing residual orange oil from the juice.

9. The debittered orange juice product obtainable in accordance with the process of claim 1.

10. A method as in claim 1 including the further step of combining animal milk with the debittered juice to yield a milk and debittered orange juice drink.

11. A method as in claim 10 wherein the milk-and-debittered-orange-juice drink contains high methoxyl pectin retarding milk-curdling and the drink contains about one part milk to at least two parts debittered juice.

12. A method for debittering navel orange juice including intimately commingling the natural bitter navel juice with a vegetable fat and absorbing the bitter elements in the fat; and recovering the debittered juice from the fat.

13. A debittered navel orange juice whereof the juice has been debittered with a vegetable fat, and the debittered juice contains added nonorange juice flavor constituents.

14. An alimentary drink consisting essentially of the debittered navel orange juice product of claim 9 and animal milk yielding a nonbitter navel orange juice and milk drink, there being in the order of about one part of said milk to about one to about three parts debittered navel orange juice product.

* * * * *

UNITED STATES PATENT OFFICE
CERTIFICATE OF CORRECTION

Patent No. 3,647,476          Dated March 7, 1972

Inventor(s) Horton E. Swisher

It is certified that error appears in the above-identified patent and that said Letters Patent are hereby corrected as shown below:

In the title of the invention appearing on the front page of the patent and at the top of column 1, "NAVAL" should read --NAVEL--.

Column 2, line 14, "of" should read --or--; line 60, "of" (second occurrence) should read --or--.

Column 3, lines 5 and 6, "dissipation" should read --disposition--; line 34, "my" should read --may--.

Column 5, line 6, "formed" should read --found--; line 69, "feed" should read --food--.

Column 8, line 7, after "juice" (first occurrence) insert --drink--.

Signed and sealed this 18th day of July 1972.

(SEAL)
Attest:

EDWARD M. FLETCHER, JR.          ROBERT GOTTSCHALK
Attesting Officer                Commissioner of Patents